(12) United States Patent
Liu et al.

(10) Patent No.: US 7,719,941 B2
(45) Date of Patent: May 18, 2010

(54) METHOD FOR IDENTIFYING RECORDING CONTENTS OF AN OPTICAL DISK

(75) Inventors: Chun Nan Liu, Tai Nan County (TW); Yi Chun Lin, Tai Chung County (TW)

(73) Assignee: Sunplus Technology Co., Ltd., Hsin-Chu (TW)

( * ) Notice: Subject to any disclaimer, the term of this patent is extended or adjusted under 35 U.S.C. 154(b) by 535 days.

(21) Appl. No.: 11/826,934

(22) Filed: Jul. 19, 2007

(65) Prior Publication Data

US 2008/0019233 A1 Jan. 24, 2008

(30) Foreign Application Priority Data

Jul. 20, 2006 (TW) ............................. 95126466 A

(51) Int. Cl.
*G11B 20/18* (2006.01)
(52) U.S. Cl. .............. 369/53.23; 369/53.22; 369/53.24; 369/47.31; 369/47.34
(58) Field of Classification Search .............. 369/53.22, 369/53.23, 53.24, 47.31, 47.34
See application file for complete search history.

(56) References Cited

U.S. PATENT DOCUMENTS

| | | | | |
|---|---|---|---|---|
| 6,249,499 B1 * | 6/2001 | Andoh | ................ | 369/53.22 |
| 6,288,987 B1 * | 9/2001 | Kumagai | ................ | 369/44.29 |
| 6,522,611 B2 * | 2/2003 | Nakajima | ................ | 369/53.22 |
| 6,603,720 B1 * | 8/2003 | Kuroda et al. | ............ | 369/53.23 |
| 6,992,961 B2 * | 1/2006 | Minase et al. | ............ | 369/53.23 |
| 7,230,896 B2 * | 6/2007 | Kobayashi et al. | ....... | 369/53.14 |
| 7,277,374 B2 * | 10/2007 | Nakao et al. | ............ | 369/53.22 |
| 7,333,412 B2 * | 2/2008 | Manoh et al. | ............ | 369/53.23 |
| 2001/0014058 A1 * | 8/2001 | Ando et al. | ................ | 369/32 |
| 2002/0080701 A1 * | 6/2002 | Nakajima | ................ | 369/53.22 |
| 2003/0152000 A1 * | 8/2003 | Yamanoi et al. | ......... | 369/53.22 |
| 2004/0130986 A1 * | 7/2004 | Minase et al. | ............ | 369/47.39 |
| 2004/0165501 A1 * | 8/2004 | Nakao et al. | ............ | 369/53.23 |
| 2005/0276199 A1 * | 12/2005 | Sugai | ................ | 369/53.22 |
| 2006/0092785 A1 * | 5/2006 | Takashima et al. | ......... | 369/47.1 |
| 2007/0030771 A1 * | 2/2007 | Huang et al. | ............ | 369/44.25 |
| 2008/0247290 A1 * | 10/2008 | Kadowaki et al. | ........ | 369/53.22 |
| 2009/0010129 A1 * | 1/2009 | Ishibashi et al. | ......... | 369/53.22 |

OTHER PUBLICATIONS

Lie Lu et al., "Repeating pattern discovery and structure analysis from acoustic music data", ACM, Oct. 2004, pp. 275-282.*

* cited by examiner

*Primary Examiner*—Thuy N Pardo
(74) *Attorney, Agent, or Firm*—Muncy, Geissler, Olds & Lowe, PLLC

(57) ABSTRACT

A method for identifying an optical disk according to a radio frequency integration filtering signal includes the steps of: moving an optical head to an initial position; rotating the optical disk and making focus, moving the optical head in a direction toward an inner ring until the optical head is moved to a home position or the focus fails, reading the radio frequency integration filtering signal, and recording a maximum and a minimum thereof when the optical head is being moved; stopping the optical head and determining whether a difference between the maximum and the minimum is greater than a predetermined threshold value; setting the optical disk as a second type of disk if the difference is greater than the predetermined threshold value; and setting the optical disk as a first type of disk if the difference is smaller than or equal to the predetermined threshold value.

5 Claims, 14 Drawing Sheets

METHOD FOR IDENTIFYING RECORDING CONTENTS OF AN OPTICAL DISK

This application claims the benefit of the filing date of Taiwan Application Ser. No. 095126466, filed on Jul. 20, 2006, the content of which is incorporated herein by reference.

BACKGROUND OF THE INVENTION

1. Field of Invention

The invention relates to a method of finding a data-recorded area and an unrecorded area, and more particularly to a method of finding a data-recorded area and an unrecorded area by identifying whether data is recorded at a position of a data layer according to a reflecting intensity of the data layer on an optical disk.

2. Related Art

A conventional optical storage medium player (disk player) does not have the ability of tracking on an unrecorded area of an optical disk. Thus, it is necessary to ensure the optical head after focus is positioned in a data-recorded area when the tracking control is to be performed.

FIG. 1 is a schematic illustration showing a conventional method of positioning an optical head. Referring to FIG. 1, an optical disk 11 includes a lead-in area, a data area, a lead-out area and an unrecorded area. A control unit 12 transfers a driving signal to a driving circuit 13, and then the driving circuit 13 drives a motor 14 to control movement of an optical head 16. In the prior art, a limit switch 15 on an optical reading mechanism is usually utilized for homing the optical reading mechanism, then moves the optical head 16 toward the outer ring according to the experimental driving voltage and counts the predetermined time after escaping from the limit switch, and then stops the optical head 16 for positioning. Thus, the prior art has to verify various optical disks and various optical reading mechanisms in advance to overcome the variations.

In addition, in correspondence with the function of a disk recorder, which enables the user to use the whole recordable optical storage disk, or in order to allow data to be recorded again, the option of enabling the user to select whether to finalize the optical disk every time when the data is recorded is induced. If the user selects to finalize the optical disk, the file system, the lead-in area and the lead-out area will be recorded so that the optical disk can be widely compatible with various optical storage medium players (disk players). If the user does not select to finalize the optical disk, the file system, the lead-in area and the lead-out area will not be completely recorded. Thus, most of the optical disks only can be played in the player capable of recording the data.

When the conventional optical storage medium player is reading a recordable optical storage medium (CD-R, CD-RW, DVD+R/+RW, DVD-R/-RW or the like), the optical head has to focus on the data-recorded area so that a correct track-crossing signal (referring to FIG. 1) can be generated. If the optical head is focused on the data layer, but the area has no recorded signal, the conventional player tracking control system cannot generate the correct track-crossing signal according to the area having no recorded data. Thus, the focus point of the optical head can not be fixed on the data track to cause the tracking control system invalid. In the player with the recording function, the architecture and the front end signal processing mechanism of the optical head of the player are different from those players used for purely playing the optical disk. Thus, the track-crossing signal still can be generated in the blank area, so the optical head still can be fixed on the data track without recorded data.

In order to prevent the tracking problem in the prior art, the limit switch and a predetermined period are adopted for performing the positioning. However, the recordable optical storage medium may have a little data recorded by the user, so the area occupied by the lead-in area, the data area and the lead-out area is very small, as shown in FIG. 2, which is a schematic illustration showing a finalized recordable optical disk medium having a little data. In another aspect, the user may use a recordable optical player to record the data but does not finalize the optical disk, so only a few tracks are recorded in the data of the lead-in area. When the data of the data area is very small, the area for the tracking control may be smaller than 1 mm, as shown in FIG. 3, which is a schematic illustration showing a recordable optical disk medium, which only records a little data and is not finalized. In this case, using the conventional method to position the initial position of the optical head is very difficult. Because frictional forces on the optical reading mechanism are not uniform, and the recorded initial positions on the optical disks may be slightly different from one another, or the driving circuit itself may have drift and difference. Thus the read failure may occur when the conventional method is used to read the optical disk.

In addition, the non-finalized recordable optical storage medium does not record the file system and the complete lead-in information, so the conventional read-only player cannot play this recordable optical storage medium.

SUMMARY OF THE INVENTION

It is therefore an object of the invention to provide a method of identifying whether data is recorded at a position according to a reflecting intensity of a data layer on an optical disk, and the method is utilized to classify the optical disks into at least two types according to the data recording pattern. The first type is a fully blank disk without data or a data integrity disk. The second type is a partial recording disk with the uncertain data integrity.

To achieve the above-mentioned object and others, in the invention, an optical disk is identified as a first type of optical disk (total recording or blank disk) or a second type of optical disk (partial recording disk) according to a radio frequency integration filtering signal. The method includes the steps of: moving an optical head to an initial position, which is distant from an inner ring of the optical disk by a predetermined distance; rotating the optical disk and making focus, moving the optical head in a direction toward the inner ring until the optical head is moved to a home position or the focus fails, reading the radio frequency integration filtering signal, and recording a maximum and a minimum of the radio frequency integration filtering signal when the optical head is being moved; stopping the optical head and determining whether a difference between the maximum and the minimum is greater than a predetermined threshold value; setting the optical disk as the second type of disk if the difference is greater than the predetermined threshold value; and setting the optical disk as the first type of disk if the difference is smaller than or equal to the predetermined threshold value.

In aspect of the first type of disk, the optical head is moved in a direction toward the outer ring for a fixed time and the tracking control is enabled in order to further identify whether the disk is a blank disk or a total recording disk. If the tracking control fails, it represents that the optical disk is a blank disk, and the operation stops. If the tracking control succeeds, it represents that the optical disk is a total recording and data finalized optical disk, and the playing procedure is entered.

As for the judgement of the finalized or non-finalized optical disk in aspect of the second type of optical disk, the radio frequency integration filtering signal is utilized and the optical head is moved in a direction toward the outer ring to seek whether the data block of 0x30000h exists. If the data block exists, it represents that the data on the optical disk has been finalized. If the data block does not exist, it represents that the data on the optical disk has not been finalized. If no data-recorded area after 0x30000h is found, it represents that the optical disk is a partial recording and data invalid disk.

Thus, the invention utilizing the method based on the radio frequency integration filtering signal can identify the optical disk as a total recording disk, a blank disk, a partial recording and data finalized optical disk, a partial recording and data non-finalized optical disk or a partial recording and data invalid disk, and perform associated subsequent processes according to the identified result.

DETAILED DESCRIPTION OF THE INVENTION

The method of finding a data-recorded area and an unrecorded area according to the invention will be described with reference to the accompanying drawings.

Figure 1:
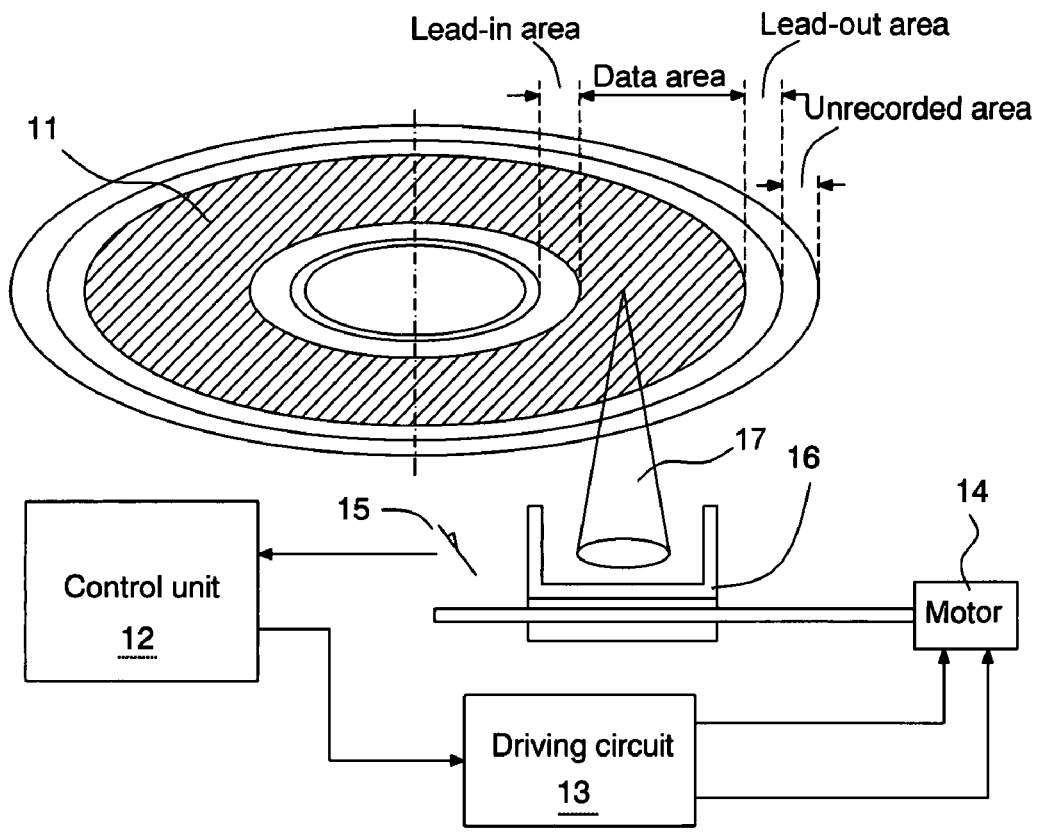
FIG. 1 is a schematic illustration showing a conventional method of positioning an optical head.
Figure 2:
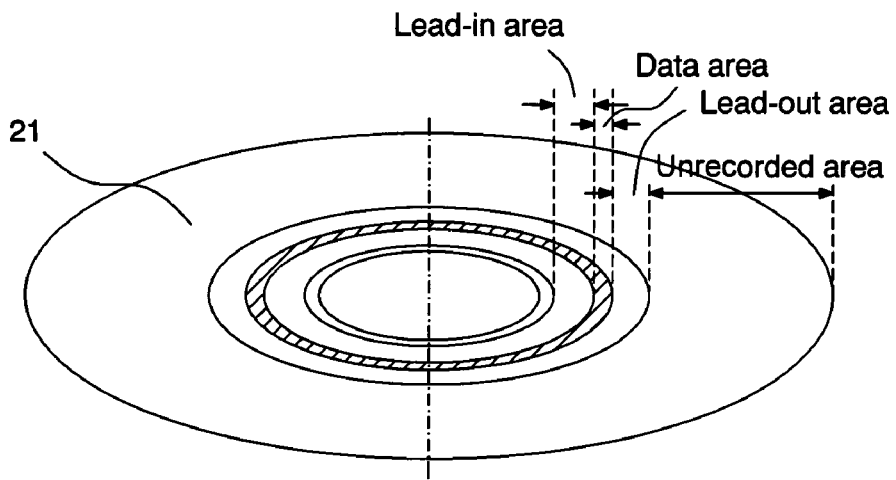
FIG. 2 is a schematic illustration showing a recordable optical disk medium, which is finalized and only recorded with a little data.
Figure 3:
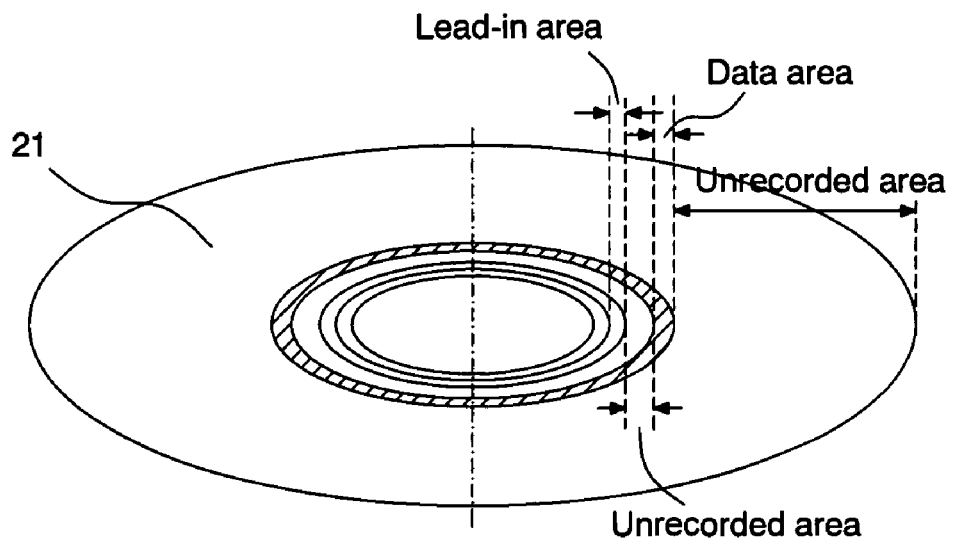
FIG. 3 is a schematic illustration showing a recordable optical disk medium, which is not finalized and only recorded with a little data.
Figure 4:
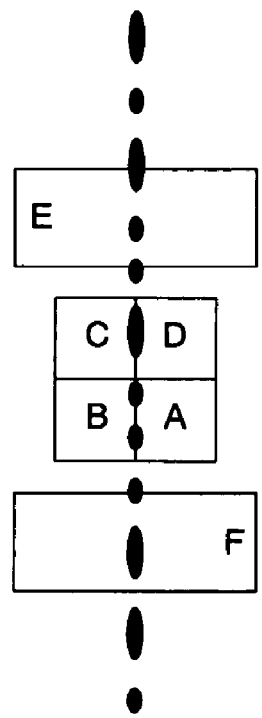
FIG. 4 shows the distribution of detecting units of a photo detector for the optical head.

The invention mainly judges whether a current position of an optical disk has recorded data according to the reflecting intensity variation of an optical signal (RF signal) in conjunction with the movement of an optical head. The reflecting variation signal of the optical signal widely exists in the conventional read only optical storage medium player, so no additional design is needed. The reflecting intensity signal of the optical disk is often generated according to RF_SUM=A+B+C+D, RF_SUM=E+F (referring to FIG. 4) or RF_SUM=PUHRF (most optical heads may output a PUHRF signal approximating A+B+C+D) in aspect of the CD light path; and according to RF_SUM=a+b+c+d or RF_SUM=PUHRF (most optical heads may output the PUHRF signal approximating A+B+C+D) in aspect of the DVD light path. FIG. 4 shows the distribution of detecting units of a photo detector for the optical head.

Figure 5:
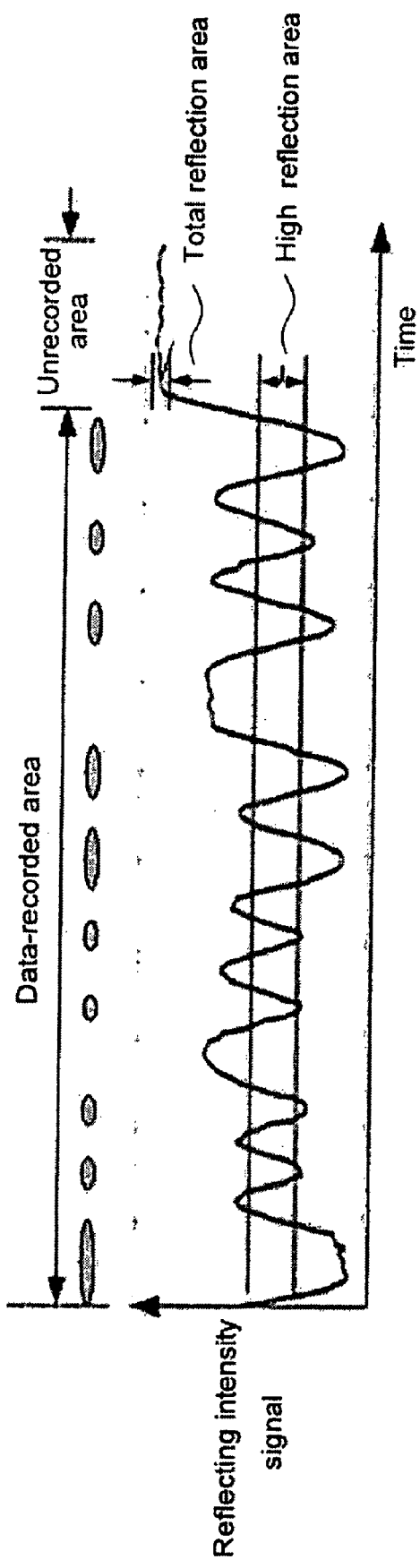
FIG. 5 is a schematic illustration showing waveform of a reflecting intensity signal in a data-recorded area and an unrecorded area.

FIG. 5 is a schematic illustration showing waveform of a reflecting intensity signal in the data-recorded area and the unrecorded area. In applications, a low-pass filter filters the radio frequency integration signal RF_SUM to obtain a radio frequency integration filtering signal RF_SUM_LPF in order to prevent the noise problem or the influence of the different reflecting intensities on the recorded data points on the optical disk. The radio frequency integration filtering signal RF_SUM_LPF is conventionally used to judge whether the focus has been completed. That is, when the radio frequency integration filtering signal RF_SUM_LPF is higher than a predetermined reference level, it is judged that the focus succeeds. On the contrary, if the signal RF_SUM_LPF is lower than the predetermined reference level, it is judged that the focus fails.

Figure 6:
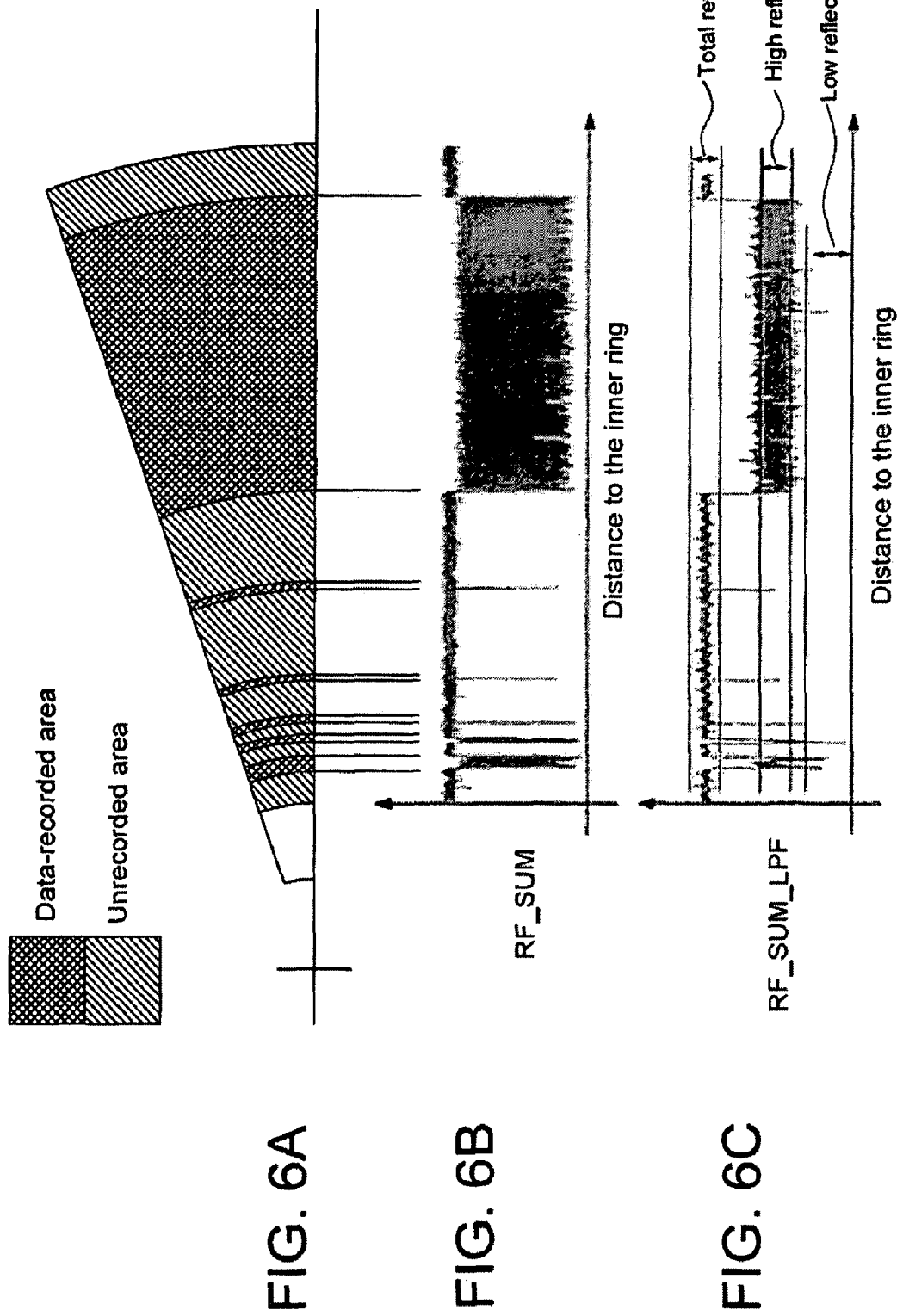
FIG. 6A shows the distribution of the data-recorded areas and the unrecorded areas on an optical disk.
FIG. 6B shows waveforms corresponding to the radio frequency integration signal of FIG. 6A.
FIG. 6C shows setting explanations of the radio frequency integration filtering signal and each reflective region corresponding to FIG. 6A.

FIG. 6A shows the distribution of the data-recorded areas and the unrecorded areas on the optical disk. FIG. 6B shows waveforms corresponding to the radio frequency integration signal of FIG. 6A. FIG. 6C shows setting explanations of the radio frequency integration filtering signal and each reflective region corresponding to FIG. 6A. As shown in FIGS. 6A to 6C, in the embodiment of the present invention, identifying the data-recorded area and the unrecorded area according to the reflecting intensity variation of the optical signal can effectively avoid the prior art drawbacks. In the past, the reflecting intensity variation of the optical signal is only utilized to judge whether the focus succeeds or whether the current signal has a defect. With respect to the recordable optical storage medium, however, it is possible to judge the low reflection, the high reflection and the total reflection according to the reflecting intensity of the optical signal. The low reflection represents that the current focus fails or the current area has a defect. The high reflection represents that the focus is on a data layer, and the current position has recorded data. The total reflection represents that the focus is on the data layer, but the current position has no recorded data.

The non-finalized recordable optical storage medium cannot be directly read because no file system and no complete lead-in area information are recorded. In this type of optical disk, however, the last track of the data-recorded area has recorded the associated playing information. Thus, if the method of the invention can be utilized, it is possible to find the junction between the data-recorded area and the unrecorded area. The optical head may be moved from the junction in a direction toward the inner ring of the optical disk by several data tracks (because the optical head starts to enter the data-recorded area, the track-crossing signal may normally appear, and the number of tracks may be calculated), wherein the number of tracks is determined according to the consideration for enabling the tracking control to enter the stable state sufficiently. Next, the tracking control and the data decoding is performed, so that the playing information recorded in the last track of the data-recorded area can be found.

The invention mainly divides the radio frequency integration filtering signal RF_SUM_LPF, which is often used in the prior art to identify whether the focus is completed, into three areas including a total reflection area, a high reflection area and a low reflection area. First, the optical head is moved to obtain the variation of the radio frequency integration filtering signal RF_SUM_LPF corresponding to the current optical disk. The total reflection area, the high reflection area and the low reflection area are created according to the variation result of the radio frequency integration filtering signal RF_SUM_LPF. Then, the subsequent step may be determined according to the application. For example, the optical head may be again moved and the current radio frequency integration filtering signal RF_SUM_LPF may be utilized to find the data-recorded area for the tracking control, or the optical head may be moved to find the end data area of the last data-recorded area so that the associated playing information recorded on the optical storage medium in the non-finalizing operation may be obtained.

Figure 7:
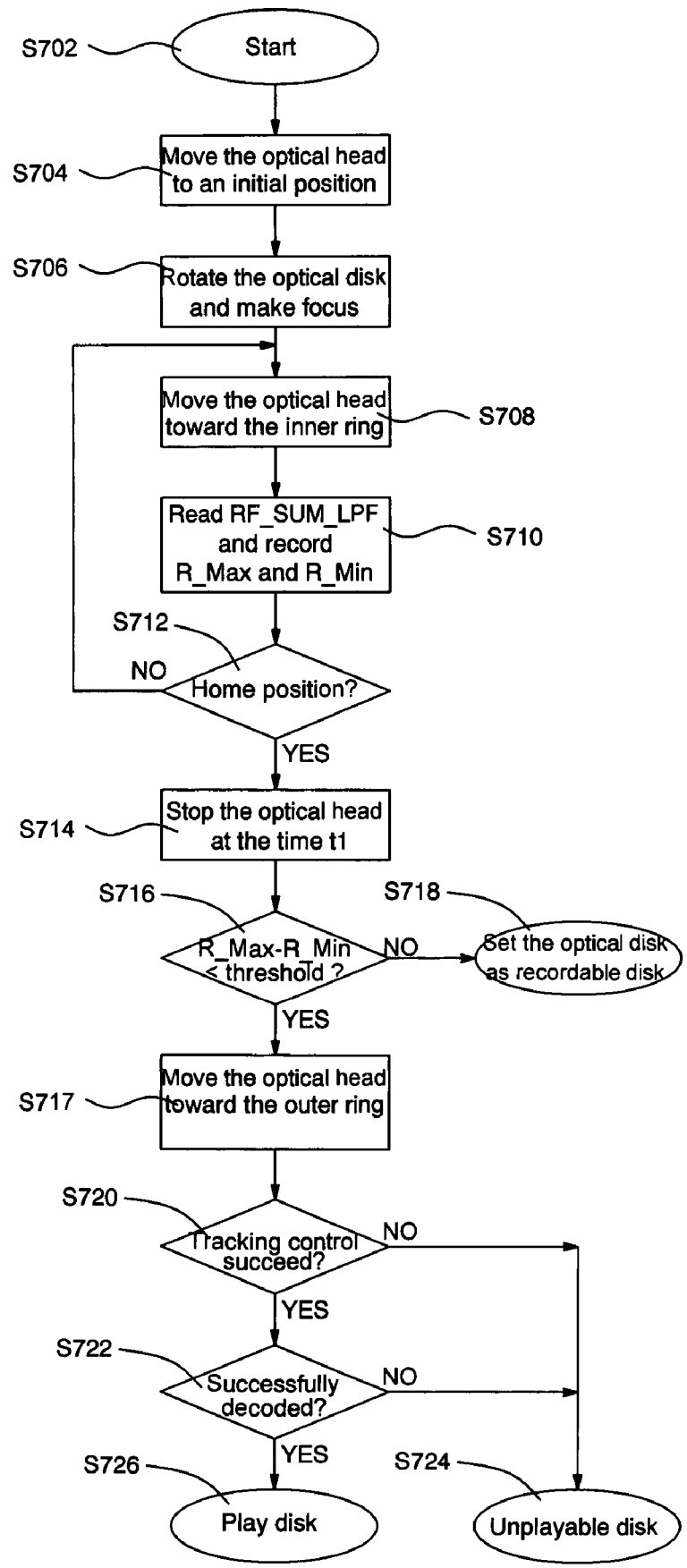
FIG. 7 is a flow chart showing a method for identifying an optical disk as a normal disk, an invalid optical disk or a recordable optical disk according to the invention.

FIG. 7 is a flow chart showing a method for identifying an optical disk as a normal disk, an invalid optical disk or a recordable optical disk according to the embodiment of the present invention.

Step S702: start.

Step S704: move the optical head to an initial position, which is distant from the inner ring of the optical disk by a distance. For example, the optical head after being moved to the home position is moved in a direction toward the outer ring to the position distant from the inner ring of the optical disk.

Step S706: rotate the optical disk and make focus. Whether the focus succeeds may be identified according to the reflecting intensity as performed in the prior art. After the focus succeeds, the procedure enters step S708.

Step S708: move the optical head in a direction toward the inner ring, wherein, when the optical head starts to move is defined as t0, and the driving voltage for moving the optical head is defined as V.

Step S710: read the radio frequency integration filtering signal RF_SUM_LPF and record the maximum R_Max and the minimum R_Min of the radio frequency integration filtering signal RF_SUM_LPF.

Step S712: detect whether the optical head is moved to the home position (i.e., whether the detecting limit switch 15 is enabled) or the focus fails. If the optical head is not moved to the home position yet or the focus does not fail, the step S708 will be returned. If the optical head is moved to the home position or the focus fails, the step S714 will be performed.

Step S714: stop the optical head at the time defined as t1. That is, the optical head is moved for the total time (t1-t0).

Step S716: determine whether the difference between the maximum R_Max and the minimum R_Min is smaller than a predetermined threshold value. If yes, the step S717 will be performed, or otherwise the step S718 will be performed.

Step S718: set the optical disk as the recordable disk and then performs the procedure of identifying whether the optical disk is finalized.

Step S717: move the focusing point of the optical head in the direction toward the outer ring of the optical disk with the voltage and the time the same as those in the steps S708 to S714. That is, the driving voltage V drives the optical head to move toward the outer ring of the optical disk for the time (t1-t0).

Step S720: enable the tracking control. If the tracking control fails, it represents that the optical disk is a blank disk, and the step S724 will be performed. If the tracking control succeeds, it represents that the optical disk is a total recording optical disk, and the step S722 will be performed to continue the subsequent reading operation.

Step S722: identify whether the data has been successfully decoded. If the data decoding fails, it represents that the optical disk is an invalid disk, and the step S724 will be performed. If the data decoding succeeds, it represents that the optical disk is a total recording optical disk, and the step S726 will be performed to continue the subsequent operation.

Step S724: display that the optical disk is an unplayable disk and stops the operation.

Step S726: perform the conventional playing procedure.

According to the above-mentioned steps, the embodiment of the present invention can identify the optical disk as a total recording disk, a blank disk, an invalid optical disk or a recordable optical disk without making sure whether the disk is finalized in advance according to the radio frequency integration filtering signal, and then perform the associated subsequent processes.

The method of identifying the data-recorded area according to the invention will be described in the following. First, the maximum R_Max of the radio frequency integration filtering signal minus a total-reflection-area lower bound (total reflection lower limit) serves as a first total reflection threshold value of the radio frequency integration filtering signal. The maximum R_Max of the radio frequency integration filtering signal plus a total-reflection-area upper bound (total reflection upper limit) serves as a second total reflection threshold value of the radio frequency integration filtering signal. The first total reflection threshold value and the second total reflection threshold value serve as area identifying values for the total reflection area. In addition, the minimum R_Min of the radio frequency integration filtering signal minus a high-reflection-area lower bound (high reflection lower limit) serves as a first high reflection threshold value of the radio frequency integration filtering signal. The minimum R_Min of the radio frequency integration filtering signal plus a high-reflection-area upper bound (high reflection upper limit) serves as a second high reflection threshold value of the radio frequency integration filtering signal. The first high reflection threshold value and the second high reflection threshold value serve as area identifying values for the high reflection area. Then, when the optical head is being moved, the system immediately samples the radio frequency integration filtering signal RF_SUM_LPF, and identifies whether the current focus position of the optical head is in the data-recorded area according to the area identifying values for the total reflection area and the high reflection area. That is, when the radio frequency integration filtering signal RF_SUM_LPF falls within the area identifying values for the high reflection area, it represents that the focus position of the optical head is in the data-recorded area.

Figure 8:
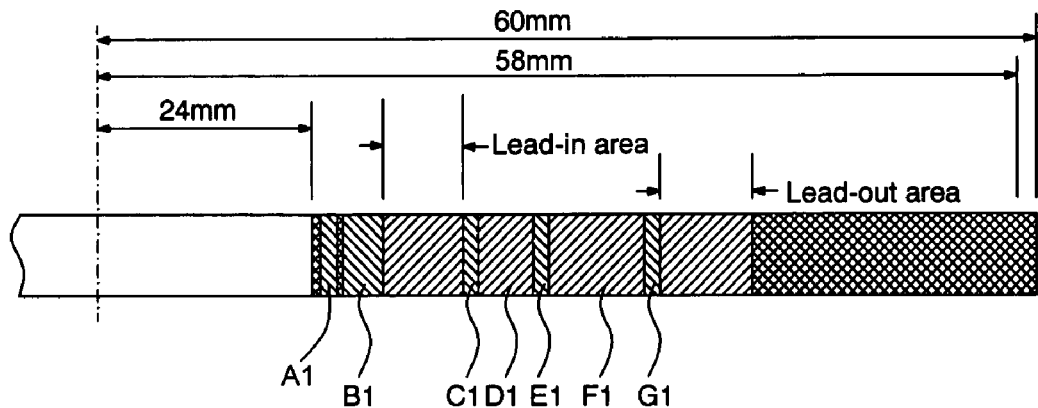
FIG. 8 shows the distribution of written areas in a typical DVD recordable optical disk, which is finalized.
Figure 9:
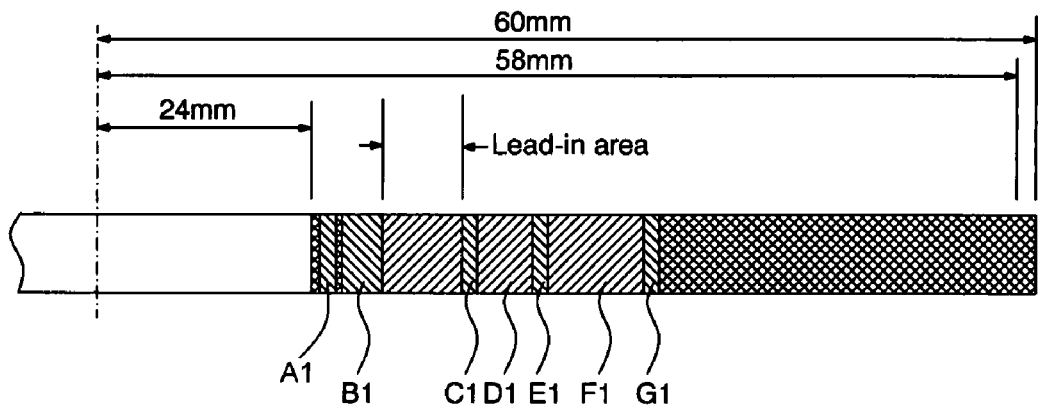
FIG. 9 shows the distribution of written areas in a typical DVD recordable optical disk, which is not finalized.

When the optical disk is identified as the recordable optical disk but it is not sure whether the optical disk is finalized, it is possible to identify whether the current recordable optical disk is the finalized optical disk or the non-finalized optical disk. Next, it is described how to identify the current recordable optical disk is the finalized optical disk or the non-finalized optical disk. FIG. 8 shows the distribution of written areas in a typical DVD recordable optical disk, which is finalized. FIG. 9 shows the distribution of written areas in a typical DVD recordable optical disk, which is not finalized. In FIG. 8, the written areas are divided into a lead-in area, a file structure and playing information area, a data recording area and a lead-out area. In FIGS. 8 and 9, the data types in areas A1 to G1 will be described in the following.

The area A1 is a test-writing area for correcting the writing laser power, wherein the test-writing position varies according to the types of the optical disk, and the test-writing length varies according to the manufacturers of the optical drive.

The area B1 is a temporary data storage area, wherein the temporarily written data, such as the initial recording address of the user record fragment, and the data length vary according to the types of the optical disk and the manufacturers of the optical drive. The temporary data storage area typically has about 2 to 5 ECC block lengths, which are only about 1 to 2 data tracks, and it is very difficult for the player to obtain the data in this area.

The area C1 is for recording the information such as the file system of the user record data fragment, wherein the initial position is 0x30000h (a predetermined address), and the length is not constant.

The area D1 is provided for the user to record the fragment at the first time.

The area E1 records the authoring method and the file system for the user to record the fragment at the first time.

The area F1 is provided for the user to record the fragment at the second time.

The area G1 records the authoring method and the file system for the user to record the fragment at the first and second times.

As shown in FIG. 8, the continuous recording area exists after the lead-in area, so the normal tracking control and the track jumping control may be performed as long as the optical head is initially focused on this area, wherein the read only optical disk may be read according to this kind of method.

The non-finalized optical disk has the architecture shown in FIG. 9. The recordable drive only records a little playing information in the areas E1 and G1 in order to allow the user to record the data in the disk subsequently, and the area G1 substantially covers the area E1. So, we only have to provide the playing information for the area G1 to the decoder end, and the decoder end can identify the length content of the user data at the initial position according to the provided information so that the disk may be played.

Figure 10A:
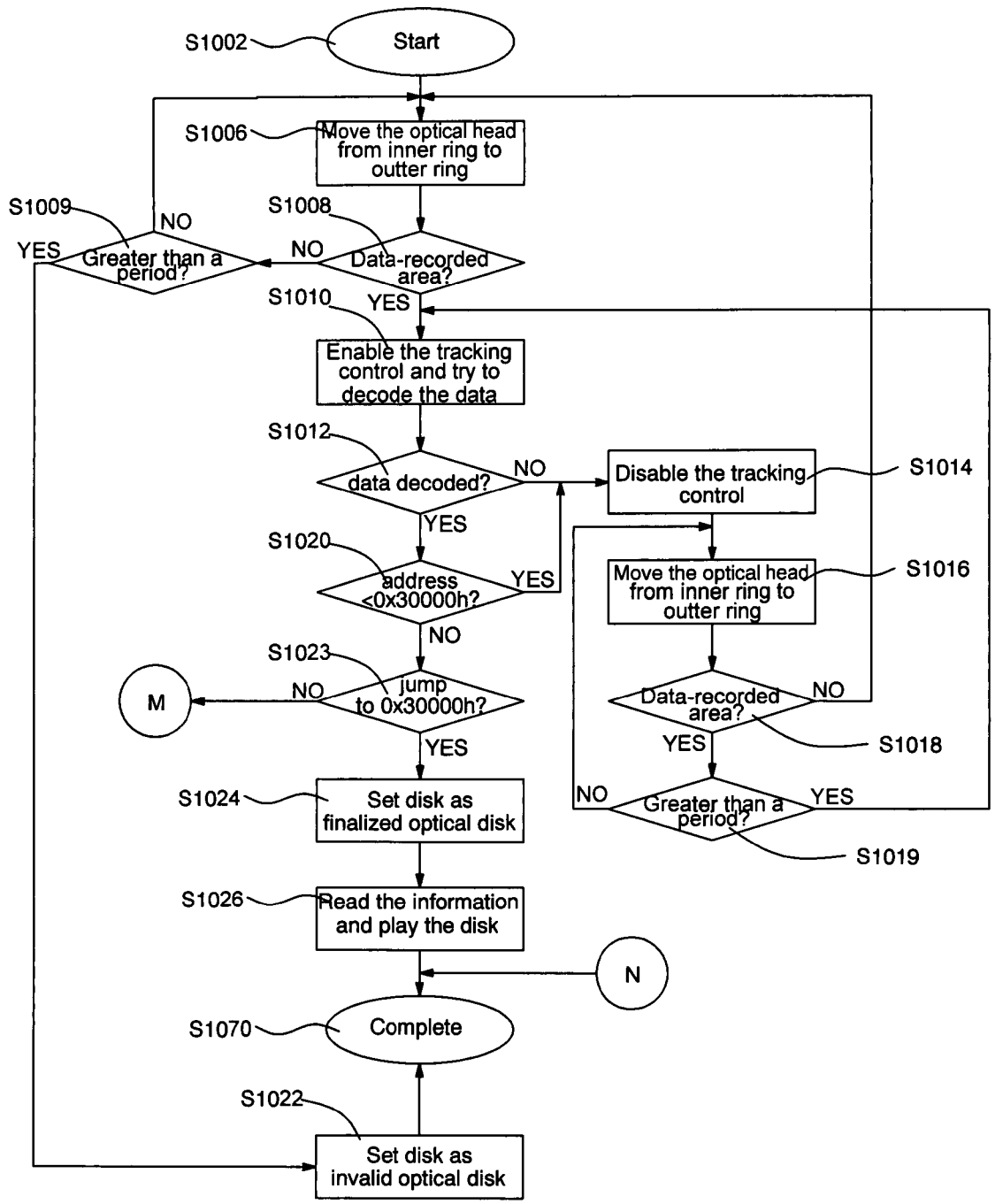
FIGS. 10A and 10B are flow charts showing a method of identifying a recordable optical disk as a finalized optical disk or a non-finalized optical disk.
Figure 10B:
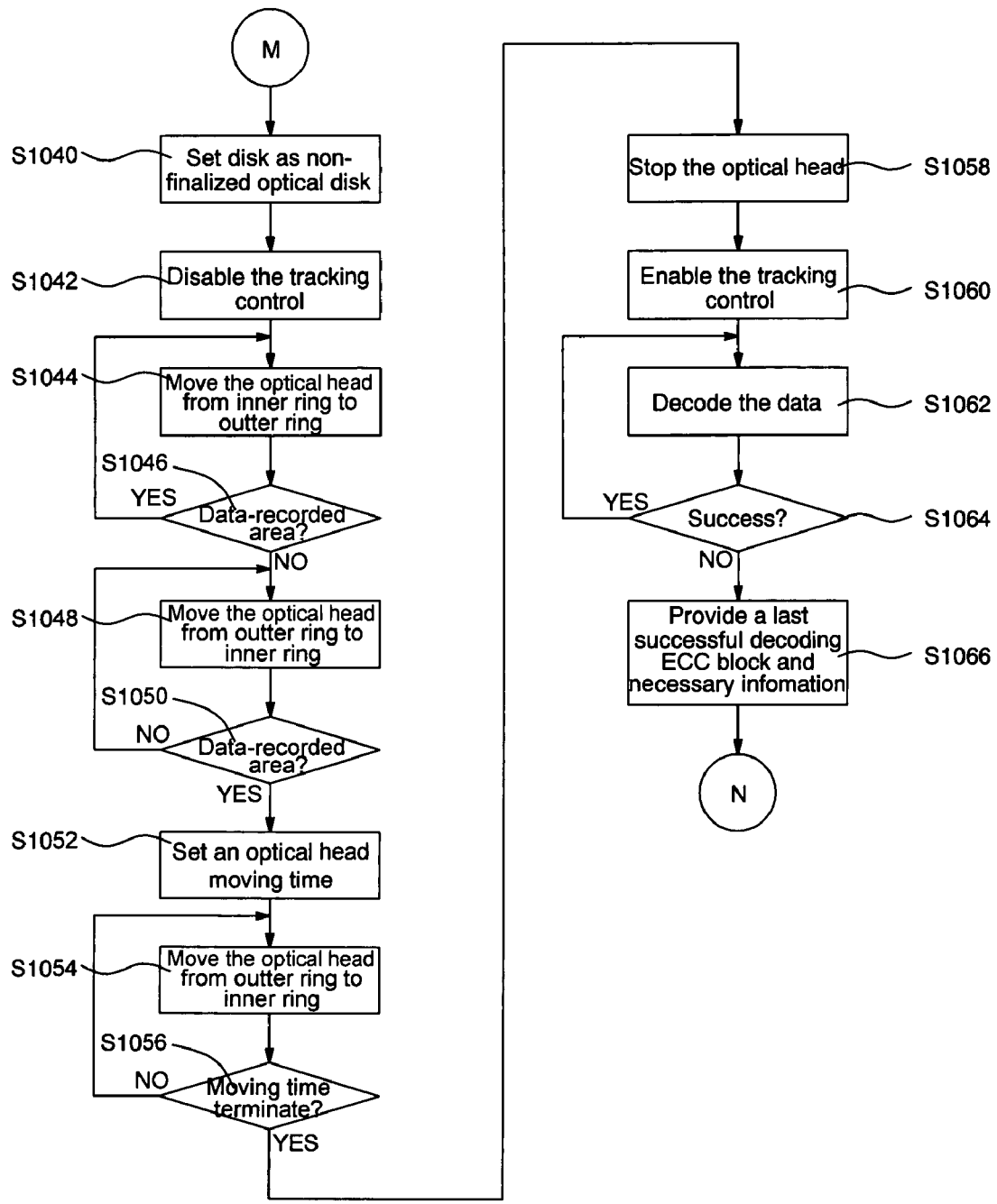

FIGS. 10A and 10B are flow charts showing a method of identifying a recordable optical disk as a finalized optical disk or a non-finalized optical disk. Illustrations will be made with reference to FIGS. 10A and 10B, wherein the flow follows step S718 of FIG. 7.

Step S1002: start.

Step S1006: move the optical head in a direction from the inner ring of the optical disk to the outer ring of the optical disk.

Step S1008: identify whether the current focusing area of the optical head is the data-recorded area. That is, the identification is made according to the above-mentioned identifying method of the data-recorded area. If the current focusing area of the optical head is not the data-recorded area, the step S1009 will be performed. If the current focusing area of the optical head is the data-recorded area, the step S1010 will be performed.

Step S1009: calculate whether the moving time of step S1006 is greater than a predetermined value. If the moving time of step S1006 is greater than the predetermined value, it represents that the optical head has been moved from the inner ring to the outer ring for a sufficient period of time, but still cannot find the data-recorded area higher than the address 0x30000h, and the step S1022 will be performed. If the moving time of step S1006 is still not greater than the predetermined value, the step S1006 will be performed to continue to find the area toward the outer ring of the optical disk.

Step S1010: enable the tracking control and try to decode the data.

Step S1012: detect whether the data decoding succeeds. If the current area is the test-writing area A1 (refer to FIG. 8), the data decoding may fail (depending on the data written when the recordable optical drive is performing the test-writing), and the step S1014 will be performed to continue to find the next piece of recorded data. If the data decoding succeeds, the step S1020 will be performed.

Step S1014: disable the tracking control.

Step S1016: move continuously the optical head from the inner ring to the outer ring of the optical disk.

Step S1018: identify whether the current focusing area of the optical head is the data-recorded area. If the current focusing area of the optical head is not the data-recorded area, the step S1006 will be returned. If the current focusing area of the optical head is the data-recorded area, the step S1019 will be performed.

Step S1019: determine whether the moving time of the step S1016 is greater than a predetermined value. If the moving time is greater than the predetermined value, the step S1010 will be performed; or otherwise the step S1016 is returned to continue moving the optical head.

Step S1020: identify whether the current address is lower than 0x30000h. When the contents of the optical disk have been finalized, the optical head starts to write the playing information and the file structure of the contents of the optical disk from this address 0x30000h. If the current address is lower than 0x30000h, the step S1014 will be performed to continue to find the next data-recorded area. If the current address is higher than or equal to 0x30000h, the step S1023 will be performed.

Step S1022:

Step S1023: perform the tracking control and enabling the seeking mechanism to try to jump the track to the position of 0x30000h. If the track jumping succeeds, it represents that the address 0x30000h has been recorded with data, and the step S1024 will be performed. If the track jumping fails, the step S1040 will be performed.

Step S1024: set the optical disk as the finalized optical disk.

Step S1026: read the information such as the file system, and transfer the information to the MPEG system for playing the information. Then, the step S1070 will be performed.

Step S1040: set the optical disk as the non-finalized optical disk.

Step S1042: disable the tracking control function.

Step S1044: move continuously the optical head from the inner ring to the outer ring of the optical disk.

Step S1046: identify whether the current focusing area of the optical head is the data-recorded area. If the current focusing area of the optical head is not the data-recorded area, the step S1048 will be performed. If the current focusing area of the optical head is the data-recorded area, the S1044 will be returned to continue moving the optical head.

Step S1048: move the optical head in the direction from the outer ring to the inner ring of the optical disk.

Step S1050: identify whether the current focusing area of the optical head is the data-recorded area. If the current focusing area of the optical head is not the data-recorded area, the step S1048 will be returned. If the current focusing area of the optical head is the data-recorded area, the step S1052 will be performed.

Step S1052: set an optical head moving time to make sure the number of tracks is sufficient so that the tracking control is stable and the data may be decoded.

Step S1054: move the optical head in the direction from the outer ring to the inner ring of the optical disk.

Step S1056: detect whether the optical head moving time terminates. If the optical head moving time does not terminate, the step S1054 will be returned. If the optical head moving time terminates, the step S1058 will be performed.

Step S1058: stop the optical head.

Step S1060: enable the tracking control function.

Step S1062: decode the data.

Step S1064: detect whether the data decoding fails. If the data decoding succeeds, the step S1062 will be returned to continue decoding. If the data decoding fails, the step S1066 will be performed.

Step S1066: provide a last successful decoding error check code block (ECC block) of the MPEG system, and the MPEG system can obtain the playing information and the file structure according to the last successful decoding error check code block, and play the contents of the non-finalized optical disk. Then, the step S1070 will be performed.

Step S1070: end.

According to the above-mentioned steps, the invention may also identify the optical disk as the finalized optical disk or the non-finalized optical disk according to the data distribution of the optical disk, and further read the associated information of the optical disk (the type of the optical disk is not fixed) and then provide the associated information to the MPEG system for playing.

Figure 11A:
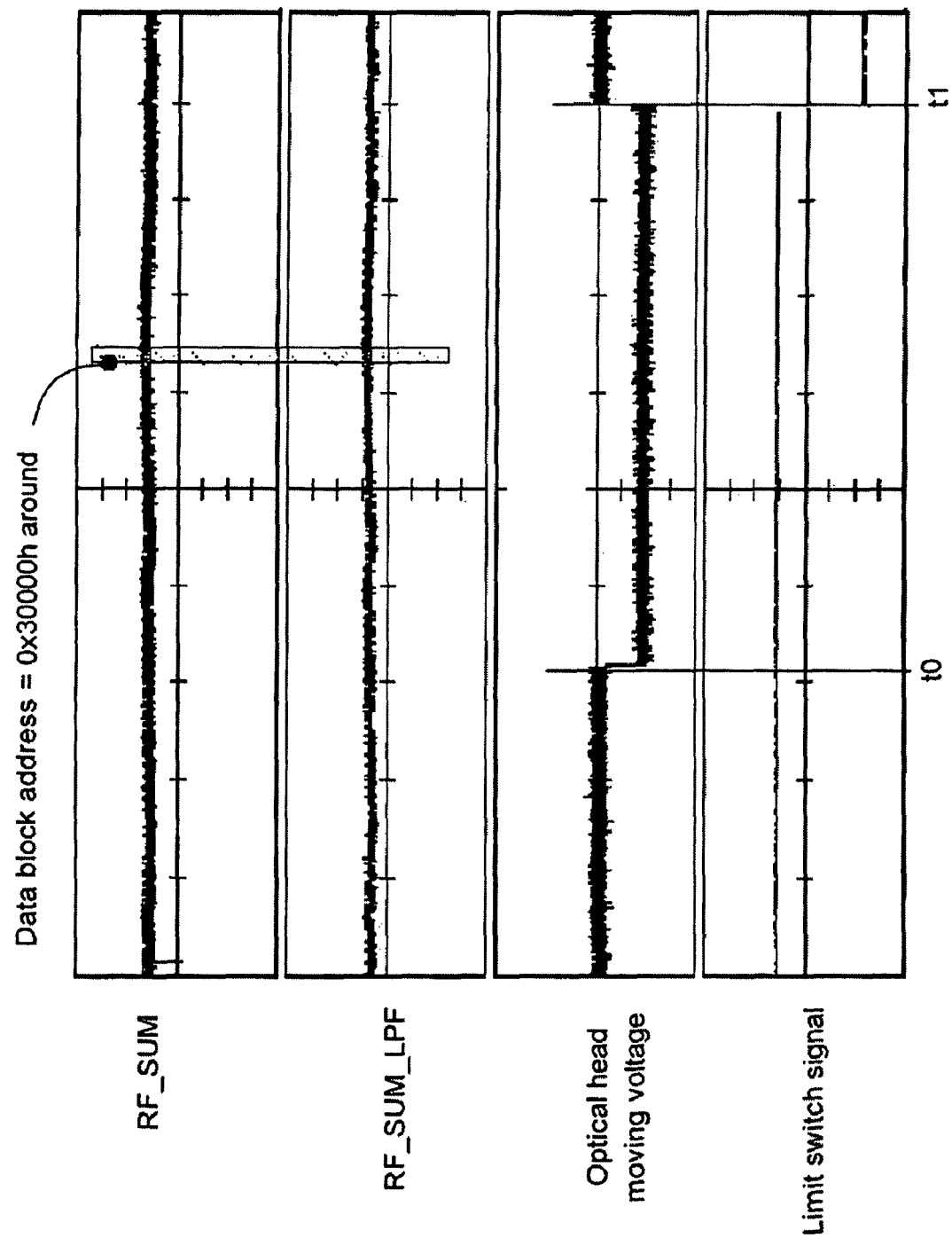
FIGS. 11A to 11F show waveforms of radio frequency integration signals, radio frequency integration filtering signals, optical head moving voltages, and signals of a limit switch corresponding to the contents of different optical disks close to the limit switch.
Figure 11B:
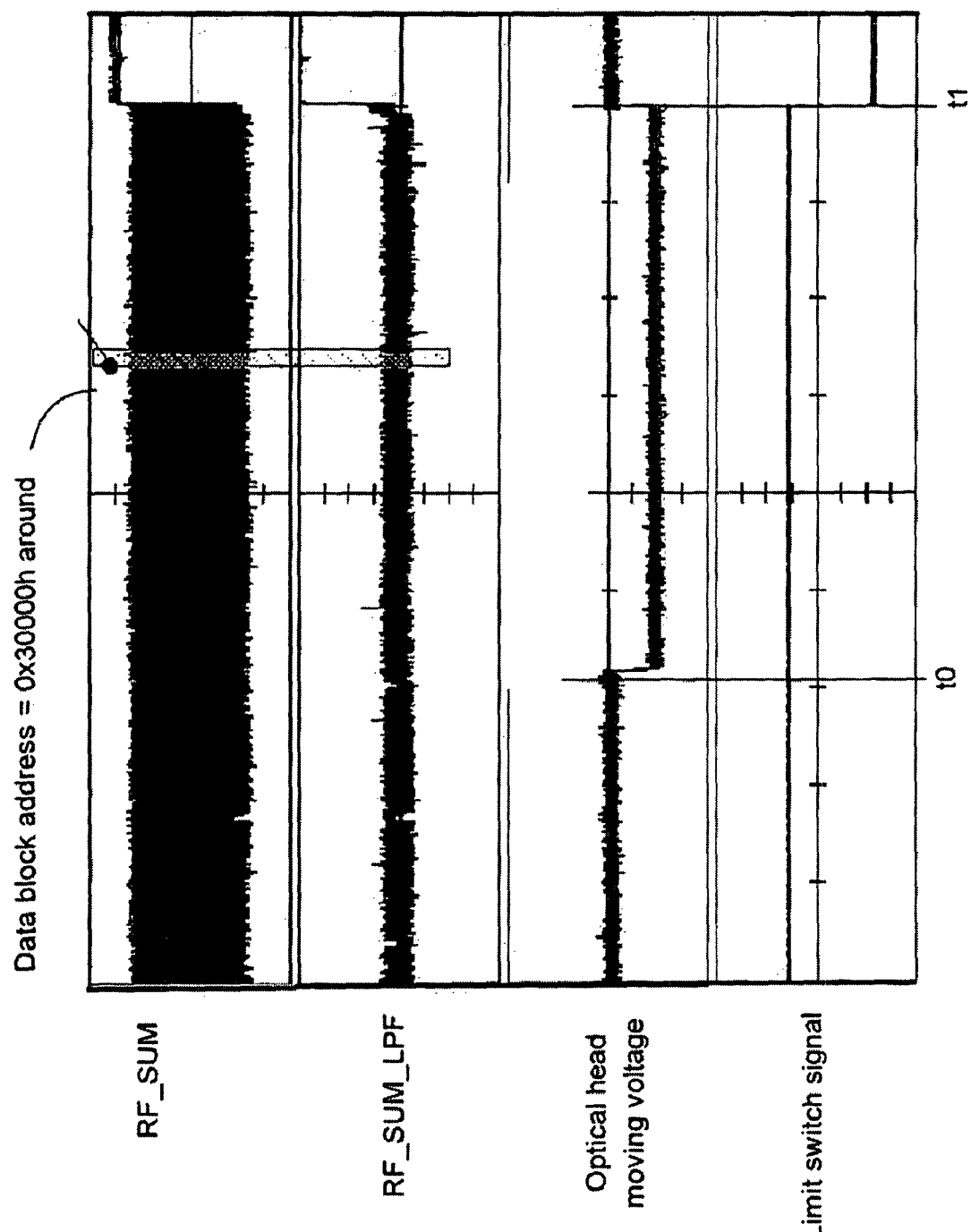
Figure 11C:
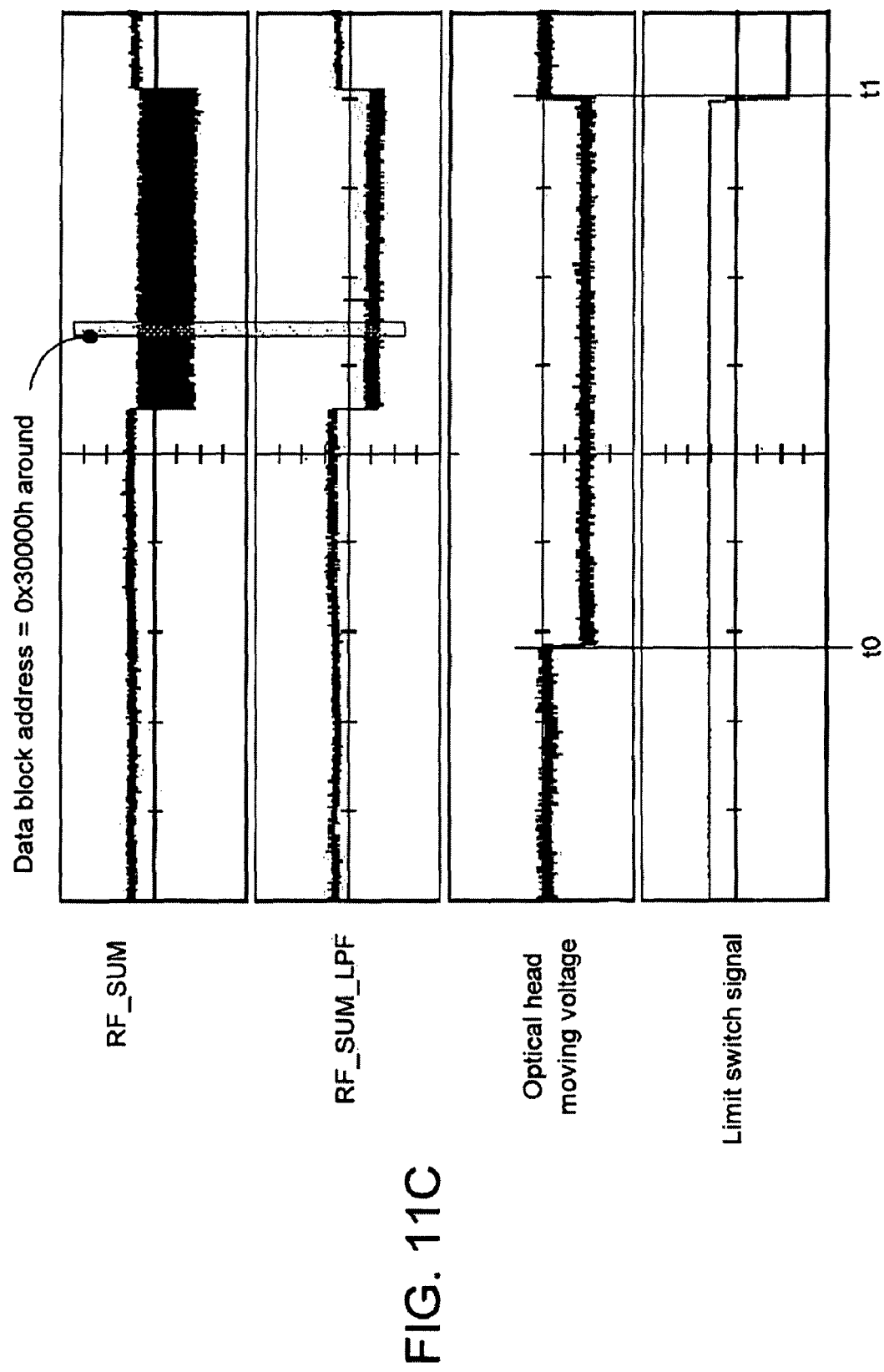
Figure 11D:
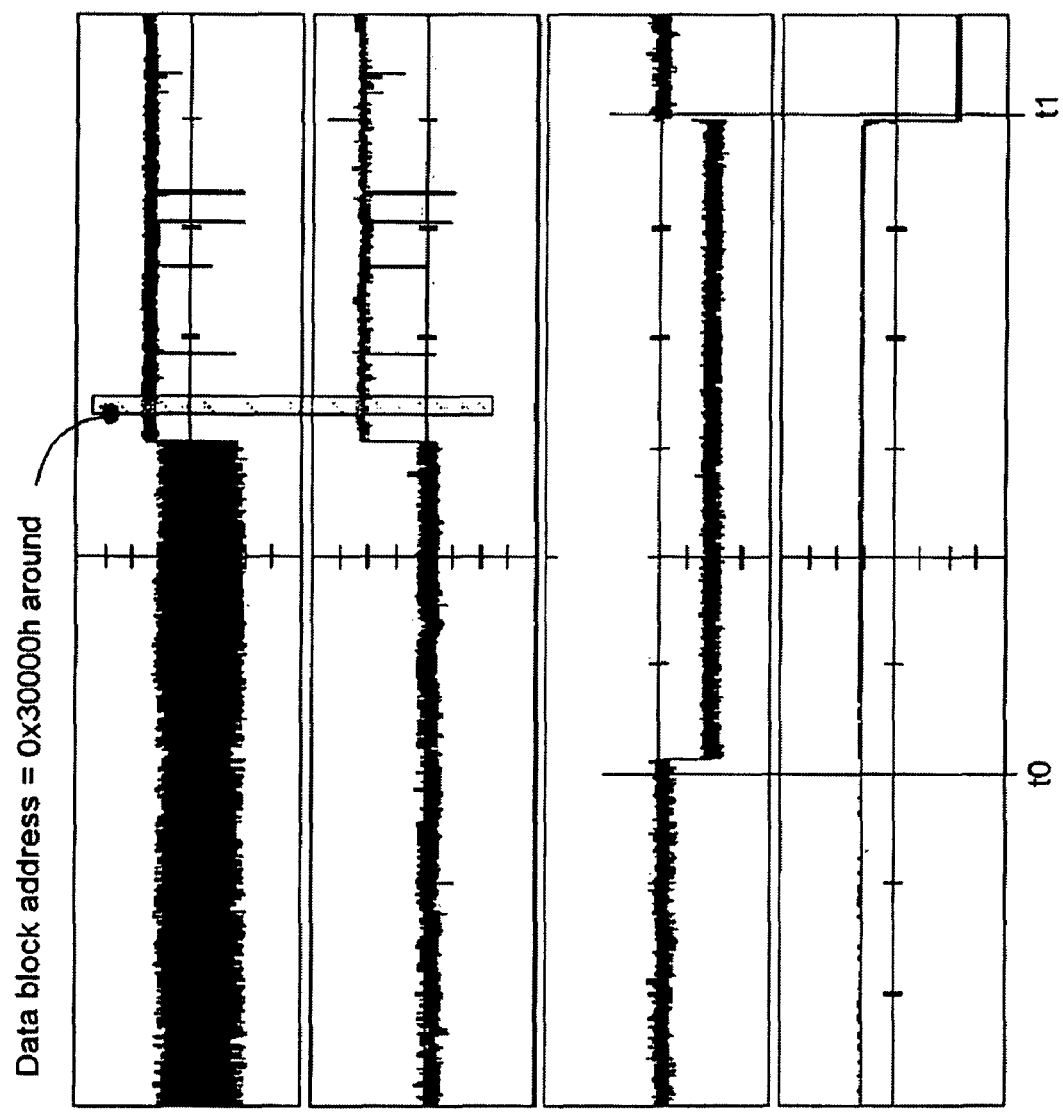
Figure 11E:
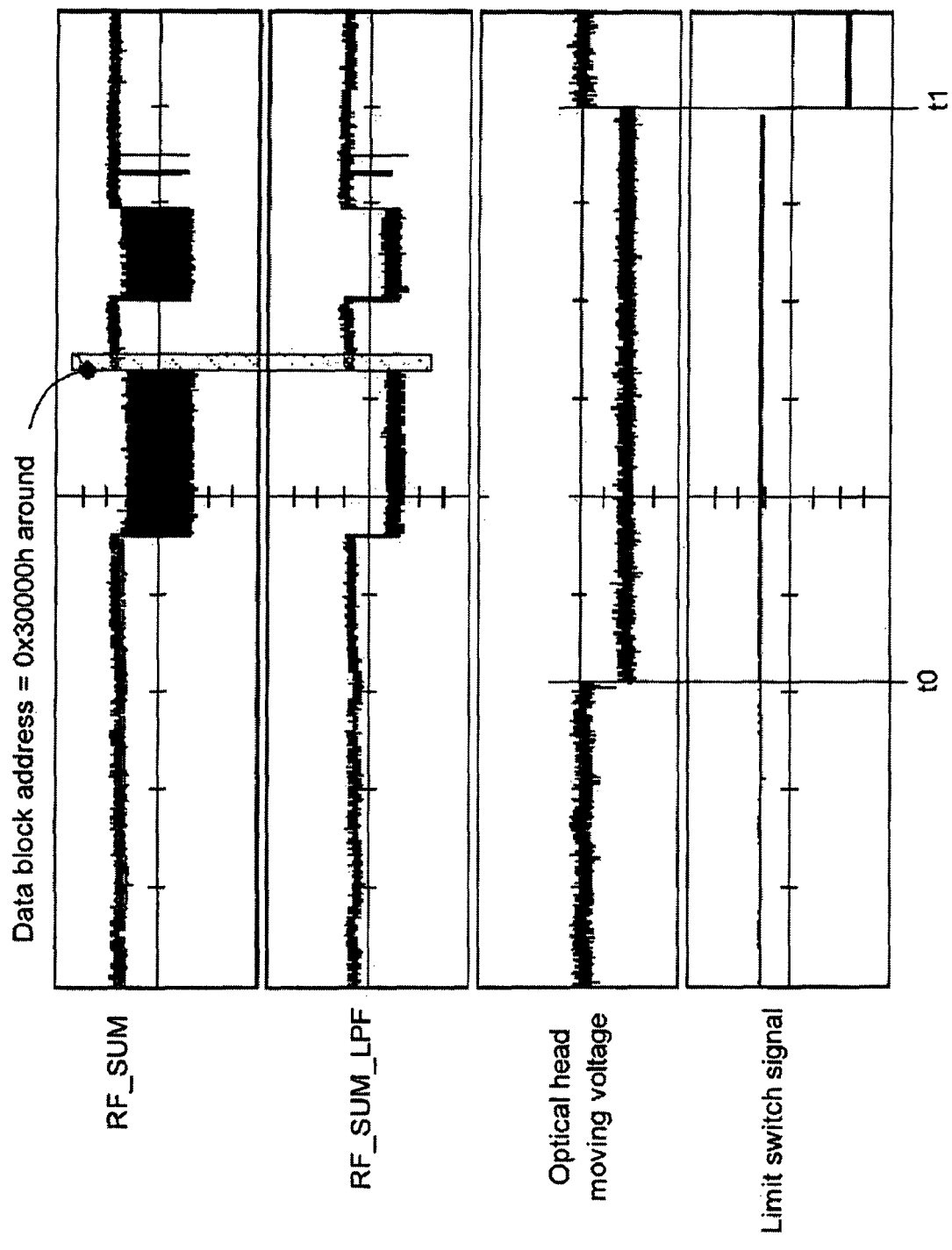
Figure 11F:
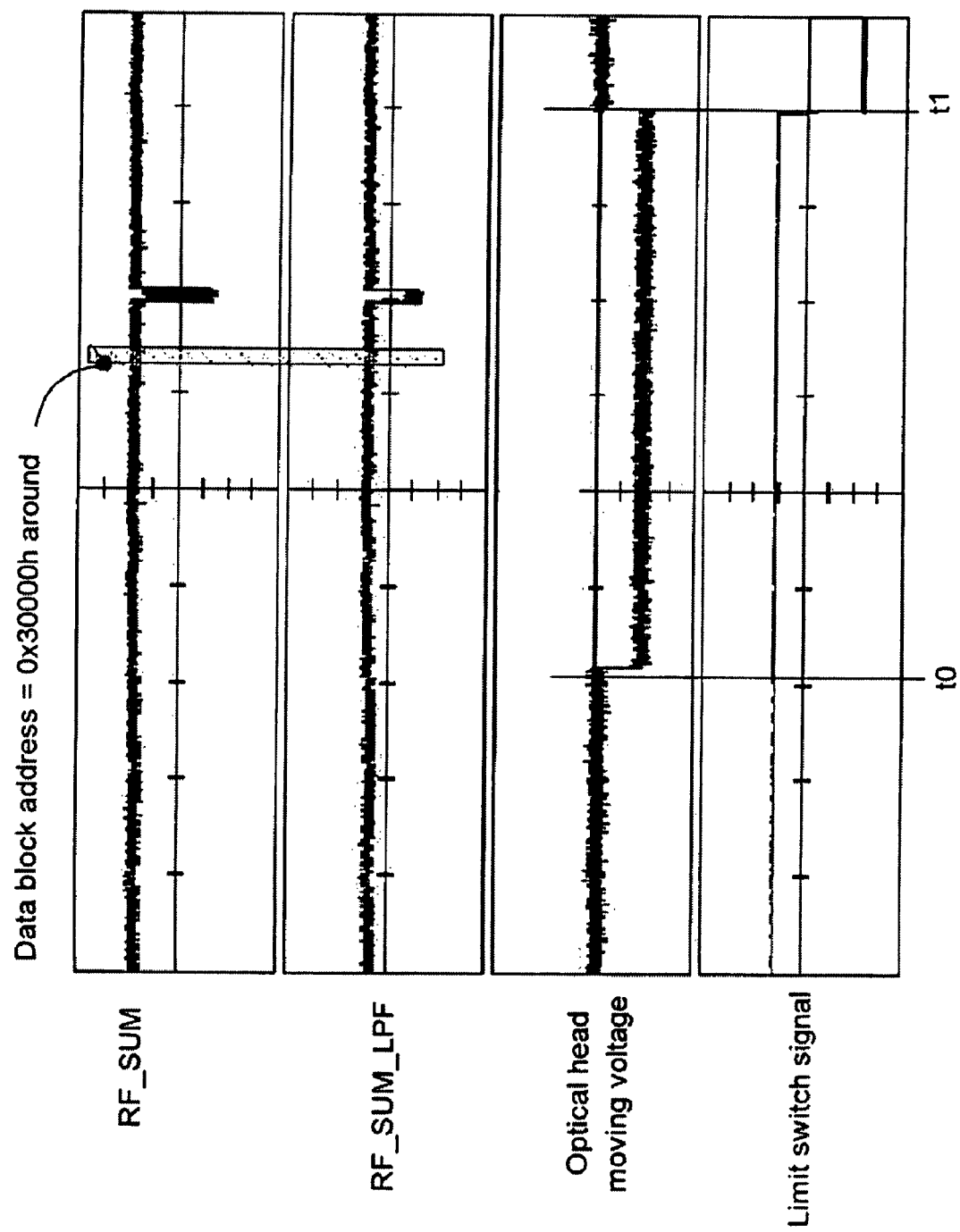

FIGS. 11A to 11F show waveforms of the radio frequency integration signals, the radio frequency integration filtering signals, the optical head moving voltages, and the signals of a limit switch corresponding to the contents of different optical disks close to the limit switch. FIG. 11A shows the contents of the blank disk, FIG. 11B shows the total recording disk, FIG. 11C shows the finalized optical disk, FIGS. 11D and 11E show the non-finalized optical disk, and FIG. 11F shows the partial recording and data invalid disk. Thus, correctly identifying the disks with different contents according to the waveform variations is achieved by the present invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for determining whether an optical disk is a normal disk, a blank disk, an invalid optical disk or a recordable disk according to a radio frequency integration filtering signal, the method comprising the steps of:

moving an optical head to an initial position, which is distant from an inner ring of the optical disk by a predetermined distance;

rotating the optical disk and making focus, moving the optical head toward the inner ring until the optical head is moved to a home position or the focus fails, reading the radio frequency integration filtering signal, and recording a maximum and a minimum of the radio frequency integration filtering signal;

stopping the optical head, determining whether a difference between the maximum and the minimum of the radio frequency integration filtering signal is greater than a predetermined threshold value, and identifying the optical disk as the recordable disk if the difference is greater than the predetermined threshold value;

if the difference is smaller than or equal to the predetermined threshold value, moving the optical head toward an outer ring of the optical disk for a predetermined time and then enabling a tracking control, and identifying the optical disk as the blank disk and stopping operating if the tracking control fails; and reading data recorded on the optical disk and identifying whether the data is successfully decoded if the tracking control succeeds, identifying the optical disk as the invalid optical disk and then stopping operating if the data decoding fails, and identifying the optical disk as the normal disk and playing the optical disk if the data decoding succeeds.

2. The method according to claim 1, wherein when identifying the optical disk as the recordable disk, the step for identifying whether the recordable optical disk is a finalized optical disk or a non-finalized optical disk comprises the steps of:

moving the optical head in a direction from the inner ring of the optical disk to the outer ring of the optical disk for a predetermined seeking time to seek a data-recorded area which data is decoded successfully and which address is higher than the address of 0x30000h;

identifying the optical disk as the invalid optical disk if the data-recorded area is not found during the predetermined seeking time;

performing the tracking control and enabling a seeking mechanism to track-jump to the address of 0x30000h, and setting the optical disk as the finalized optical disk if the track-jump succeeds, it represents that the address of 0x30000h has been recorded by data, then reading information of a file system, and transferring the information to a MPEG system for playing;

setting the optical disk as the non-finalized optical disk and disabling the tracking control if the track-jump to the address of 0x30000h fails;

continuously moving the optical head from the inner ring of the optical disk to the outer ring of the optical disk, and seeking a non-data-recorded area in the area currently focused by the optical head;

moving the optical head in a direction from the outer ring of the optical disk to the inner ring of the optical disk, and seeking the data-recorded area in the area currently focused by the optical head;

enabling the tracking control and performing the data decoding until the data decoding fails after moving the optical head in the direction from the outer ring of the optical disk to the inner ring of the optical disk for a default time; and providing a last successful decoding error check code block for the MPEG system having a playing information and a file structure according to the last successful decoding error check code block and plays contents of the non-finalized optical disk.

3. The method according to claim 2, wherein the step of identifying the data-recorded area comprises:

subtracting a total-reflection-area lower bound from the maximum of the radio frequency integration filtering signal to obtain a first total reflection threshold value of the radio frequency integration filtering signal, and adding a total-reflection-area upper bound to the maximum of the radio frequency integration filtering signal to obtain a second total reflection threshold value of the radio frequency integration filtering signal;

providing the first total reflection threshold value and the second total reflection threshold value as area identifying values for total reflection areas;

subtracting a high-reflection-area lower bound from the minimum of the radio frequency integration filtering signal to obtain a first high reflection threshold value of the radio frequency integration filtering signal, and adding a high-reflection-area upper bound to the minimum of the radio frequency integration filtering signal to obtain a second high reflection threshold value of the radio frequency integration filtering signal;

providing the first high reflection threshold value and the second high reflection threshold value as the area identifying values for high reflection areas; and sampling the radio frequency integration filtering signal when the optical head is being moved, and identifying whether a focused position of the optical head is in the data-recorded area according to the area identifying values for the total reflection areas and the high reflection areas, wherein when the radio frequency integration filtering signal falls within the area identifying values for the high reflection areas, the focused position of the optical head is in the data-recorded area.

4. A method of identifying whether a recordable optical disk is a finalized optical disk or a non-finalized optical disk, the method comprising the steps of:

moving an optical head in a direction from an inner ring of the optical disk to an outer ring of the optical disk for a predetermined seeking time to seek a data-recorded area which data is decoded successfully and which address is higher than a predetermined address;

identifying the optical disk as an invalid optical disk if the data-recorded area is not found during the predetermined seeking time;

performing a tracking control and enabling a seeking mechanism to track-jump to the predetermined address, and setting the optical disk as a finalized optical disk if the track-jump succeeds, it represents that the predetermined address has been recorded by data, then reading information of a file system, and transferring the information to a MPEG system for playing;

setting the optical disk as the non-finalized optical disk and disabling a tracking control function if the track-jump to the predetermined address fails;

continuously moving the optical head from the inner ring of the optical disk to the outer ring of the optical disk, and seeking a non-data-recorded area in the area currently focused by the optical head;

moving the optical head in a direction from the outer ring of the optical disk to the inner ring of the optical disk, and seeking the data-recorded area in the area currently focused by the optical head;

enabling the tracking control function and performing the data decoding until the data decoding fails after moving the optical head in the direction from the outer ring of the optical disk to the inner ring of the optical disk for a default time; and providing a last successful decoding error check code block for the MPEG system having a playing information and a file structure according to the last successful decoding error check code block and plays contents of the non-finalized optical disk.

5. The method according to claim 4, wherein the predetermined address is the address of 0x30000h.

* * * * *